(12) United States Patent
Admon et al.

(10) Patent No.: US 10,482,036 B2
(45) Date of Patent: Nov. 19, 2019

(54) SECURELY BINDING BETWEEN MEMORY CHIP AND HOST

(71) Applicant: Winbond Electronics Corporation, Taichung (TW)

(72) Inventors: Itay Admon, Tel Aviv (IL); Nir Tasher, Tel Mond (IL)

(73) Assignee: Winbond Electronics Corporation, Taichung (TW)

( * ) Notice: Subject to any disclaimer, the term of this patent is extended or adjusted under 35 U.S.C. 154(b) by 129 days.

(21) Appl. No.: 15/691,758

(22) Filed: Aug. 31, 2017

(65) Prior Publication Data

US 2018/0081827 A1    Mar. 22, 2018

Related U.S. Application Data

(60) Provisional application No. 62/396,165, filed on Sep. 18, 2016.

(51) Int. Cl.
| | | |
|---|---|---|
| G06F 21/00 | (2013.01) | |
| G06F 12/14 | (2006.01) | |
| G06F 16/903 | (2019.01) | |
| G06F 21/60 | (2013.01) | |

(52) U.S. Cl.
CPC .... *G06F 12/1408* (2013.01); *G06F 16/90335* (2019.01); *G06F 21/606* (2013.01); *G06F 2212/1052* (2013.01)

(58) Field of Classification Search
CPC ........... G06F 12/1408; G06F 17/30979; G06F 16/90335; G06F 21/606; G06F 2212/1052
See application file for complete search history.

(56) References Cited

U.S. PATENT DOCUMENTS

| | | | | |
|---|---|---|---|---|
| 8,788,842 B2* | 7/2014 | Brouwer | ............... | H04L 9/0838 713/189 |
| 9,141,783 B2* | 9/2015 | Ignatchenko | ......... | G06F 21/602 |
| 9,954,859 B2* | 4/2018 | Niset | ..................... | H04L 9/0825 |
| 2006/0064584 A1* | 3/2006 | Wei | ..................... | G06F 12/1408 713/165 |

(Continued)

OTHER PUBLICATIONS

KR Application # 10-2017-0118619 office action dated Jun. 27, 2019.

*Primary Examiner* — Don G Zhao
(74) *Attorney, Agent, or Firm* — Kligler & Associates

(57) ABSTRACT

A memory system includes an interface, a non-volatile memory and a controller. The interface is configured to communicate over an unsecured communication link with an external host. The non-volatile memory is pre-programmed with a device identifier and a corresponding initialization key that are additionally stored in a database that resides externally to the memory system, and is securely accessible by the host. The controller is configured to send the device identifier to the host, to receive from the host, via the interface, binding information that was generated in the host, to generate, using at least the received binding information and the pre-programmed initialization key, a first binding key that matches a second binding key that is generated in the host based on an initialization key securely obtained by the host from the database, and to securely communicate with the host over the communication link using the first binding key.

18 Claims, 2 Drawing Sheets

(56) References Cited

U.S. PATENT DOCUMENTS

| | | | |
|---|---|---|---|
| 2009/0143105 A1* | 6/2009 | Cho | H04L 51/38 |
| | | | 455/559 |
| 2009/0150672 A1* | 6/2009 | Kwon | H04L 9/085 |
| | | | 713/169 |
| 2010/0180130 A1* | 7/2010 | Stahl | G06F 21/10 |
| | | | 713/193 |
| 2010/0299744 A1* | 11/2010 | Mardiks | G06F 21/10 |
| | | | 726/17 |
| 2012/0221865 A1* | 8/2012 | Hahn | H04N 21/4331 |
| | | | 713/193 |
| 2013/0266137 A1 | 10/2013 | Blankenbeckler et al. | |
| 2014/0089659 A1* | 3/2014 | Brickell | G06F 21/73 |
| | | | 713/155 |
| 2015/0074394 A1* | 3/2015 | Nagai | H04L 9/0869 |
| | | | 713/168 |
| 2015/0074421 A1* | 3/2015 | Nagai | H04L 9/0822 |
| | | | 713/189 |
| 2016/0085960 A1 | 3/2016 | Priev et al. | |
| 2016/0140356 A1* | 5/2016 | Tasher | G06F 12/1408 |
| | | | 726/29 |
| 2016/0226922 A1* | 8/2016 | Russell | H04L 65/1016 |

\* cited by examiner

SECURELY BINDING BETWEEN MEMORY CHIP AND HOST

CROSS-REFERENCE TO RELATED APPLICATIONS

This application claims the benefit of U.S. Provisional Patent Application 62/396,165, filed Sep. 18, 2016, whose disclosure is incorporated herein by reference.

TECHNICAL FIELD

Embodiments described herein relate generally to data storage, and particularly to methods and systems for securely binding between a host and a memory chip.

BACKGROUND

In various user devices, a host stores data in a secured memory system such as a memory chip. To communicate securely with one another, the host and memory chip typically establish a shared secret key.

SUMMARY

An embodiment that is described herein provides a memory system that includes an interface, a non-volatile memory and a controller. The interface is configured to communicate over an unsecured communication link with a host external to the memory system. The non-volatile memory is pre-programmed with at least a device identifier and a corresponding initialization key. The device identifier and the respective initialization key are additionally stored in a database external to the memory system, the database is securely accessible by the host. The controller configured to send the device identifier to the host, to receive from the host, via the interface, binding information that was generated in the host, to generate, using at least the received binding information and the pre-programmed initialization key, a first binding key that matches a second binding key, the second binding key is generated in the host based on an initialization key securely obtained by the host from the database by querying the database using the device identifier received from the controller, and to securely communicate with the host over the communication link using the first binding key.

In some embodiments, the binding information includes a binding key generated by the host and encrypted using the initialization key obtained from the database, and the controller is configured to generate the first binding key by decrypting the encrypted binding key from the binding information using the pre-programmed initialization key. In other embodiments, the binding information includes a seed generated by the host, and the controller is configured to generate the first binding key based on the seed and on the pre-programmed initialization key. In yet other embodiments, the controller is configured to generate the first binding key by calculating a hash function over the seed and the pre-programmed initialization key.

In an embodiment, the controller is configured to receive from the host a signature that the host calculates over at least the seed and the initialization key obtained from the database, and to authenticate the binding information using the signature. In another embodiment, the controller is configured to receive from the host a signature calculated over at least part of the binding information, to authenticate the received binding information using the signature, and to accept the first binding key for communicating with the host only if the received binding information was authenticated successfully. In yet another embodiment, the controller is configured to receive a memory signature calculated over pre-programmed content of the non-volatile memory, to authenticate actual content of the non-volatile memory using the memory signature, and to accept the first binding key for communicating with the host only if the memory signature was authenticated successfully.

In some embodiments, the database stores the memory signature in association with the device identifier, and the controller is configured to receive, from the host, the memory signature that was retrieved by the host from the database using the device identifier. In other embodiments, the controller is configured to receive from the host a combined signature calculated over at least part of the binding information and over the memory signature, and to authenticate both the binding information and the pre-programmed content based on the combined signature.

There is additionally provided, in accordance with an embodiment that is described herein, a method, including, in a memory system coupled to an external host, sending a device identifier to the host over an unsecured communication link, the memory system includes a non-volatile memory pre-programmed with at least the device identifier and a corresponding initialization key. The device identifier and the respective initialization key are additionally stored in a database external to the memory system, the database is securely accessible by the host. Binding information that was generated in the host is received from the host. A first binding key is generated by the memory system using at least the received binding information and the pre-programmed initialization key. The generated first binding key matches a second binding key that is generated in the host based on an initialization key securely obtained by the host from the database by querying the database using the device identifier received from the controller. Data is securely communicated with the host over the communication link using the first binding key.

These and other embodiments will be more fully understood from the following detailed description of the embodiments thereof, taken together with the drawings in which:

DETAILED DESCRIPTION OF EMBODIMENTS

Overview

Figure 1:
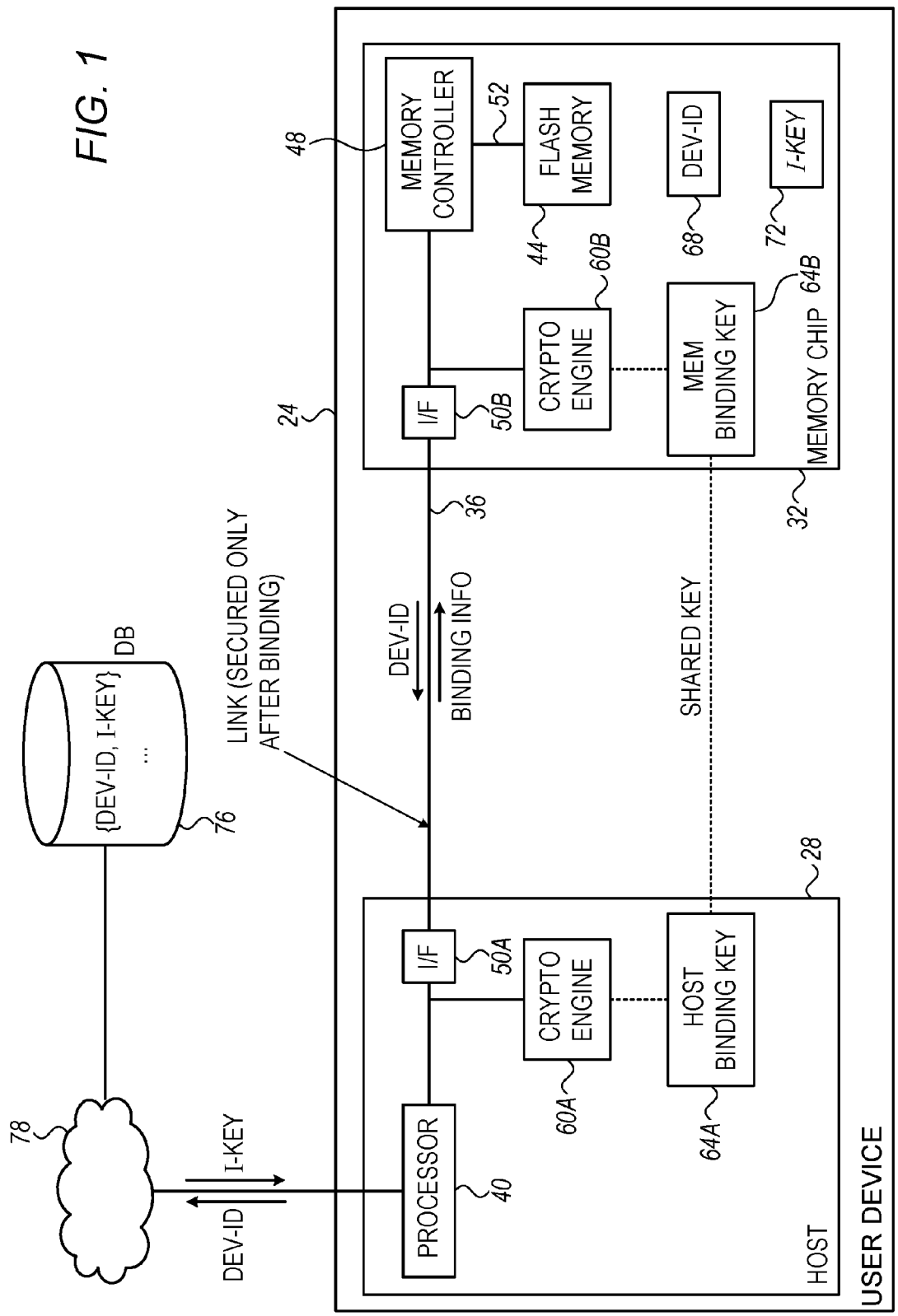
FIG. 1 is a block diagram that schematically illustrates a user device in which a host and a memory chip establish a shared secret key, in accordance with an embodiment that is described herein.

In various applications, a user device such as a smart card provides data storage as well as other services such as personal identification and authentication. Some types of user devices comprise a host coupled to a memory system. The memory system, e.g., a memory chip, typically comprises a non-volatile memory managed by a memory controller. In the description that follows we refer mainly to an example memory system that comprises a memory chip.

Embodiments that are described herein provide methods and systems for establishing a secret key that is shared between the host and memory system. The process of establishing the shared secret key is also referred to as a "binding process," or simply "binding," for brevity. A shared secret key generated by the binding process is also referred to herein as a "binding key."

In the disclosed techniques, the binding process relies on securely sharing secret information between the memory chip and host, wherein the secret information is pre-programmed in the memory chip. The binding process does not compromise the secrecy of the memory chip, even though the binding process is initiated over an unsecured link between the host and memory chip.

The binding process typically results in a binding key at the memory chip and a matching binding key at the host. The matching binding keys may be symmetric or asymmetric. In using symmetric binding keys, the host and memory chip share a common binding key. In using asymmetric binding keys, the binding keys at the host and at the memory chip are different, but nevertheless enable the host and the memory chip to communicate securely. In the context of the present disclosure and in the claims, terms such as "shared binding key," "matching binding keys" and "first binding key that matches a second binding key" refer to both symmetric and asymmetric binding keys.

The host and memory chip typically use the matching binding keys to encrypt information exchanged between them, to mutually authenticate each other, and to prevent unauthorized access to secret information in the memory chip when the authentication fails.

In principle, after the host is physically connected to the memory chip by a suitable link, the host could generate a secret key locally and send this secret key to the memory chip to complete the binding process. Since, however, the link between the host and memory chip is typically unsecured until completing the binding process, such a binding scheme may be vulnerable to security attacks in which an unauthorized user attempts to gain access to confidential information stored in the memory chip. The embodiments that will be described below implement binding schemes that retain secrecy of the memory system.

In some embodiments, the memory chip is pre-programmed with a unique device identifier (denoted Dev-ID) and with a corresponding secret initialization key (denoted I-Key). The Dev-ID and I-Key are additionally stored in a database external to the user device, possibly a third-party database. The database is securely accessible by the host.

In some embodiments, the host initiates a binding process by sending a binding request to the memory controller. In response, the memory controller sends its pre-programmed Dev-ID to the host, which securely retrieves the I-Key corresponding to the Dev-ID from the database. The host generates binding information and sends this binding information to the memory controller. The binding information may comprise the binding key itself (e.g., sent encrypted by the host) or other binding information from which the binding key can be derived. The host and memory controller produce matching binding keys based on the binding information and I-Key. Specifically, the host produces its binding key based on the generated binding information and the I-Key instance obtained from the database. The memory controller generates its binding key based on the binding information received from the host and on the pre-programmed I-Key.

In some embodiments, the host sends to the memory controller binding information that comprises a binding key generated by the host and encrypted using the I-Key instance obtained from the database. The memory controller decrypts the binding information using the pre-programmed I-Key to recover the binding key. In other embodiments, the binding information comprises a random seed generated by the host. The host and memory controller generate respective binding keys based on the random seed and respective instances of the I-Key, e.g., by calculating a suitable hash function over the random seed and I-Key. Alternatively, the host similarly generates the binding information based on generating a non-random seed. In the context of the present disclosure and in the claims, the term "seed" refers broadly to various types and implementations of seeds, including, for example, random, pseudo-random and non-random seeds.

In some embodiments, the memory controller authenticates the binding information using a signature received from the host, which calculates the signature over the binding information and the instance of the I-Key obtained from the database. The memory controller completes the binding process only if the binding information was authenticated successfully. In some embodiments, before completing the binding process, the memory controller erases the entire (or only part of) non-volatile memory or at least all confidential information stored in the non-volatile memory.

In some embodiments, e.g., in case of mass production, the memory chip is pre-programmed with content that should not be erased. In some embodiments, the database stores, in association with the Dev-ID, a memory signature calculated over the pre-programmed content (or over relevant parts of the pre-programmed content). In an embodiment, given the Dev-ID, the host retrieves the memory signature from the database and sends it to the memory controller for authenticating the pre-programmed content actually stored in the memory chip. In an embodiment, the signature for authenticating the binding information and the memory signature are combined in a single signature so that the memory controller applies only one authentication operation that covers both the binding information and pre-programmed content.

System Description

FIG. 1 is a block diagram that schematically illustrates a user device 24 in which a host and a memory chip establish a shared secret key, in accordance with an embodiment that is described herein. User device 24 comprises a host 28, coupled to memory chip 32 of the user device via a communication bus or link 36. Memory chip 32 stores data for the host in a non-volatile memory 44, a Flash memory in the present example. At least some of the data stored in memory chip 32 is confidential and should not be exposed or leaked outside the memory chip.

Memory chip 32 can be used in various user host systems and devices. For example, memory chip 32 can be used in smart cards for various applications such as, for example, credit cards, fuel cards, mobile phone SIM cards, pay television, pre-payment cards, high-security identification and access-control cards, electronic wallets, and the like. Memory chip 32 can also be used in computing devices, Personal Computers (PCs) or computer servers, cellular phones or other communication terminals, removable memory modules, Solid State Disks (SSD), Secure Digital (SD) cards, Multi-Media Cards (MMC) and embedded MMC (eMMC), digital cameras, music and other media players, Internet of Things (IOT) nodes and/or any other system or device in which data is stored and retrieved.

Host 28 comprises a processor 40 that executes suitable programs as required by the user device. Host 28 comprises a suitable interface 50A for communicating with the memory chip over communication bus 36. Host 28 additionally comprises means for communicating securely with a database installed in a remote server.

Non-volatile memory 44 typically comprises a plurality of memory cells (not shown). In the present example, non-volatile memory 44 comprises a Flash memory, but may alternatively be implemented using any other suitable storage technology. The storage capacity of non-volatile memory 44 depends on the storage requirements of the hosting user device and may be, for example, on the order of several Megabits or even several Gigabits.

Memory chip 32 comprises a memory controller 48 that manages data storage in non-volatile memory 44. Memory controller 48 communicates with host 28 over communication bus 36 via a suitable interface 50B. Memory controller 48 may be coupled to non-volatile memory 44 via any suitable internal communication bus or link 52. In memory chip 32, any information transmitted between the memory controller and the non-volatile memory over communication bus 52 is inaccessible outside memory chip 32.

Communication bus 36 between the host and memory chip may comprise any suitable bus or link operating in accordance with any suitable protocol. Communication bus may comprise, for example, a Serial Peripheral Interface (SPI) bus or an Inter-Integrated Circuit (I2C bus). Communication bus 36 may operate as a serial bus or as a parallel bus, sending and receiving information at any suitable rate. An SPI bus and similarly an I2C bus may operate at bitrates of several Kbps to several Mbps (e.g., over 400 Mbps in 50 MHz-based Octal SPI bus).

The host and memory chip comprise respective cryptographic engines 60A and 60B, which support cryptographic operations such as encryption, decryption, hashing and authentication. Cryptographic engines 60A and 60B apply cryptographic operations using respective binding keys 64A and 64B. Although we generally assume that binding keys 64A and 64B are identical, this assumption is not mandatory, and asymmetric (i.e., different) binding keys 64A and 64B can also be used. A binding process for establishing the binding keys will be described in detail below. In general, cryptographic engines 60A and 60B may be used for purposes other than secure binding, possibly using secret keys other than 64A and 64B.

Memory chip 32 comprises a unique device identifier (also denoted Dev-ID) and an associated respective secret initialization key 72 (also denoted I-Key). Dev-ID 68 and its associated I-Key 72 may be pre-programmed into the memory chip at production, or after the memory chip and host are assembled together within the user device. In some embodiments, the Dev-ID and associated I-Key are pre-programmed in non-volatile memory 44. In some embodiments, to initialize Dev-ID and I-Key, the memory chip is coupled to an initialization server that programs Dev-ID and a respective I-Key to the memory chip, and sends the pair {Dev-ID, I-Key} in a secured manner to a database 76 for logging. Database 76 resides externally to the user device and is typically implemented in a server or other suitable computer.

Secret I-Key 72 may be assigned uniquely per memory chip or shared among multiple memory chips. After pre-programmed in the memory chip, I-Key 72 cannot be read or over-written via any of the desiged interfaces of the memory chip or of the user device.

In the example of FIG. 1, host 28 communicates with database 76 over a communication network 78, such as, for example, an Ethernet or Internet Protocol (IP) network, using any suitable secured communication protocol. Alternatively, communication network 78 may operate in accordance with any other suitable standard or protocol. Further alternatively, host 28 connects directly to database 76 using a suitable secured bus or link.

The configurations of user device 24 and memory chip 32 in FIG. 1 are example configurations, which are chosen purely for the sake of conceptual clarity. In alternative embodiments, any other suitable configurations of a user device and a memory chip can also be used. The different elements of memory chip 32, such as memory controller 48 and cryptographic engine 60B may be implemented using any suitable hardware, such as in an Application-Specific Integrated Circuit (ASIC) or Field-Programmable Gate Array (FPGA). Non-volatile memory 44 may be implemented using any suitable type of solid-state memory, e.g., using one or more Flash memory devices. In some embodiments, some elements of memory chip 32, host 28 or both, can be implemented using software, or using a combination of hardware and software elements.

In some embodiments, certain elements of user device 24, such as memory controller 48 and/or processor 40, may comprise one or more general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

In user device 24, host 28 and memory chip 32 may each comprises a separate semiconductor die, and the two dies reside on a common package or on separate packages. Alternatively, host 28 and memory chip 32 are fabricated on a monolithic die. In some embodiments, memory controller 48, non-volatile memory 44 and cryptographic engine 56, all reside in a common die comprising memory chip 32.

Methods for Secure Binding

First we give a general outline of embodiments that carry out a secured binding process, and further below we describe methods for secure binding in detail. In carrying out a binding process, the memory chip reports pre-programmed Dev-ID 68 to the host over link 36. Pre-programmed Dev-ID 68 is considered non-secret and may be exposed over link 36. The host queries database 76 in the remote server with the reported Dev-ID, and in response, the database retrieves the I-Key logged in the databased in association with this Dev-ID. The server holding database 76 then sends the retrieved I-Key to the host in a secured manner.

At this point, each of the host and memory chip holds an instance of the secret initialization key. Specifically, the memory chip has an instance of the I-Key that was pre-programmed to the memory chip, and the host has an instance of secret I-Key that was retrieved from the database.

The host generates binding information and sends this binding information to the memory chip over link 36, possibly in a secured manner. Based on the binding information and the respective I-Key instances, the host and memory chip locally derive matching binding keys.

Figure 2:
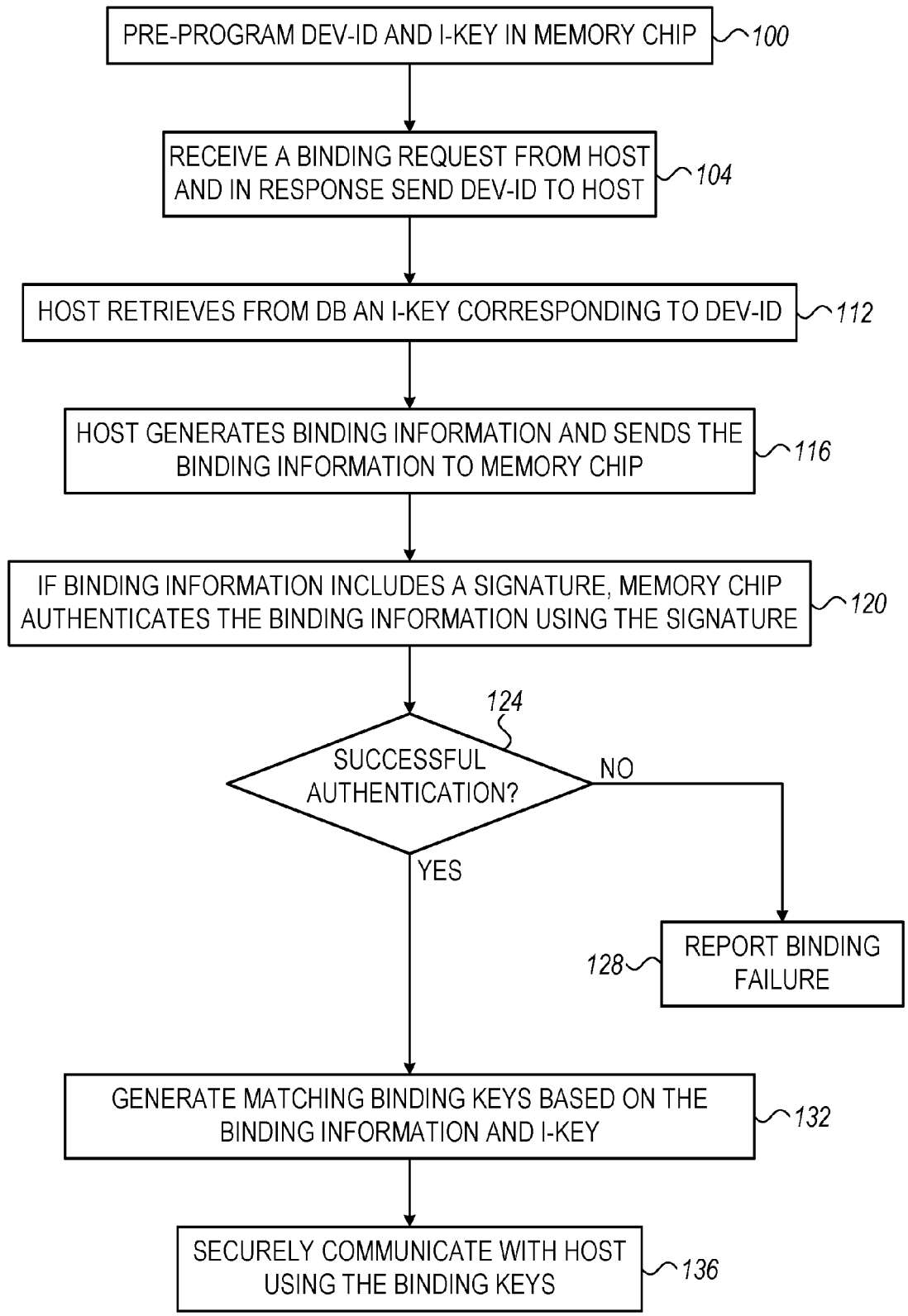
FIG. 2 is a flow chart that schematically illustrates a method for secure binding, in accordance with an embodiment that is described herein.

FIG. 2 is a flow chart that schematically illustrates a method for secure binding, in accordance with an embodiment that is described herein. The method may be executed, for example, by memory controller 48 and host 28 that are interconnected in user device 24 via link 36.

The method begins with memory controller 48 receiving, e.g., from an initialization server, a device identifier and an associated initialization key, and programming the received device identifier as DEV-ID 68 and the received initialization key as I-Key 72 in non-volatile memory 44, at a pre-programming step 100. The memory controller may receive the Dev-ID and associated I-key from the initialization server comprised in a suitable initialization command. The initialization server additionally logs the pair {Dev-ID, I-Key} in database 76, as described above.

At a binding request step 104, the memory controller receives from host 28 a binding request, over link 36. In response to receiving the binding request, the memory controller reads pre-programmed Dev-ID 68 and sends the read Dev-ID back to the host over link 36.

At a query step 112, host 28 queries database 76 using the Dev-ID received from the memory controller. In some embodiments, the host queries database 76 by sending to the database a suitable query command that contains the Dev-ID, over communication network 78. Further at step 112, the host receives from the database the I-Key corresponding to the queried Dev-ID. Note that the database sends the I-Key to the host, e.g., over communication network 78, in a secured manner. Therefore, no entity other than memory chip 32 and host 28 can gain knowledge of I-Key 72 programmed in the memory chip. Additionally, the instance of I-Key obtained from the database is kept secret within host 28.

At a binding step 116, the host generates binding information and sends this binding information to the memory controller. Based on the binding information and I-Key, the host and memory chip can produce matching respective binding keys 64A and 64B. To produce binding key 64A the host uses the instance of I-Key retrieved from the database. To produce binding key 64B, the memory controller uses the pre-programmed I-Key 72.

In some embodiments, at step 116, the host generates binding information that comprises binding key 64A, encrypted using the I-Key obtained from the database. The host may encrypt binding key 64A to produce the binding information using any suitable encryption method.

In other embodiments, at step 116, the host generates binding information that comprises a seed. The seed may be random, pseudo-random or non-random. The host may generate the random or pseudo-random seed using a random number generator or using any other suitable method. The host sends the generated seed (as the binding information) to the memory controller, e.g., unsecured.

In some embodiments, at step 116, the host generates for the binding information a signature, and sends the signature to the memory controller for authentication. For example, the host may produce the signature by calculating a suitable hash function "H" over the binding information or over part of the binding information. At an authentication step 120, the memory controller receives the signature from the host and authenticates the binding information using the signature.

In some embodiments, at step 120, the memory controller calculates the hash function H over the received binding information to produce a test signature. At a verification step 124, the memory controller compares between the test signature and the signature received from the host, and in case these signatures do not match, the memory controller reports a binding failure event at a failure reporting step 128, and the method terminates.

When at step 124 the test signature and the signature received from the host match, the binding information is authenticated successfully, and the memory controller proceeds to a binding key generation step 132. At step 132, the memory controller generates binding key 64B, based at least on the binding information received at step 116 and on I-Key 72 that was pre-programmed at step 100. Methods for generating binding keys 64A and 64B are described in detail below.

Following step 132, the host and memory controller have matching binding keys 64A and 64B, and communicate securely with one another using the binding keys, at a secure communication step 136. In some embodiments, prior to accepting binding key 64B for communication, the memory controller erases the entire (or only part of) non-volatile memory 44, or erases all confidential information stored in non-volatile memory 44, so as to prevent exposing secret information contained in the memory chip.

To communicate securely with one another, the memory controller and host may encrypt data to be sent over link 36, and decrypt data received over link 36. Additionally or alternatively, the memory controller and host may sign the data sent over link 36 and authenticate signed data received over link 36.

Host 28 and memory controller 48 generate respective binding keys 64A and 64B in accordance with the type of binding information used. For example, as described above, in some embodiments, the host generates binding key 64A, and the binding information comprises binding key 64A encrypted using the I-key obtained from the database. In such embodiments, the memory controller generates a matching binding key (64B) by decrypting the binding information using pre-programmed I-Key 72.

As another example, when the binding information comprises a seed, the host and memory controller generate respective binding keys 64A and 64B by calculating BK=H (I-Key,Seed), wherein BK denotes a binding key, Seed denotes the seed generated by the host, and I-Key denotes pre-programmed I-Key 72 for calculating BK (64B) in the memory controller and the I-Key retrieved from the database for calculating BK (64A) in the host.

In some embodiments, e.g., in case of mass production, non-volatile memory 44 of memory chip 32 is pre-programmed with content that should not be erased. In such embodiments, the memory controller is required to authenticate the pre-programmed content before accepting binding key 64B.

In some embodiments, for protecting the pre-programmed content, a memory signature (denoted MemSig) corresponding to this content is stored in database 76, in association with preprogrammed Dev-ID 72. Alternatively, the memory signature may be stored in some database other than database 76, or in some other information source (the other database and other source are not shown in FIG. 1). Further alternatively, MemSig is generated by the host (when the host has knowledge of the relevant pre-programmed content).

The memory signature may be calculated over relevant memory content using a suitable cryptographic function, e.g., a suitable hash function. In an embodiment, in calculating MemSig, the hash function covers both the pre-programmed memory content and the I-Key associated with the respective Dev-ID. In non-volatile memory 44, the protected memory content may be stored in one or more sections of the memory space.

In some embodiments, given the Dev-ID, the host retrieves MemSig from the database, in addition to retrieving the I-Key as described above, and sends the retrieved MemSig to the memory controller. Alternatively, the memory controller receives the memory signature from another relevant source in which the memory signature is stored. The memory controller calculates a test memory signature over of the actual relevant content in non-volatile memory 44, and accepts binding key 64B only in response to detecting that MemSig received from the host matches the test memory signature.

In some embodiments, the host and memory controller use the memory signature for generating the binding keys, authenticating the binding information, or both. For example, in one embodiment, the host and memory controller calculate respective binding keys 64A and 64B as BK=H (I-Key,Seed,MemSig), and calculate the signature for authenticating the binding information as Signature=H(BK). In another embodiment, the host and memory controller calculate respective binding keys 64A and 64B as BK=H(I-Key,Seed), and calculate the signature for authenticating the binding information as Signature=H(BK,MemSig). In yet other embodiments, the signature used for authenticating the binding information is given by Signature=H(BK-encrypted,I-Key,MemSig), wherein BK-encrypted is the binding key encrypted using the I-Key.

The embodiments described above are given by way of example and other suitable embodiments can also be used. For example, in the embodiments described above calculating signatures is based on mainly an initialization key, i.e., pre-programmed instance I-key 72 in the memory controller, or the instance of the I-key retrieved from the database, in the host. In alternative embodiments, calculating the signatures may be based on derivatives of the I-Key instances. Each of the memory controller and host can generate one or more derivatives of its I-Key instance, for example, by calculating a suitable hash function over the I-Key instance and respective Dev-ID. Alternatively, the memory controller can calculate an I-Key derivative by calculating a suitable hash function over the I-Key instance and some seed or the memory signature.

Although in some of the embodiments described above, the binding information comprises a random seed, other suitable parameters can also be used. Such parameters include, for example, One Time Program (OTP) data and a secret key assigned to the host. The OTP data is typically programmed to a non-volatile memory of the host and never changes during the lifetime of the user device.

Although the embodiments described herein mainly address secure binding between a host and a memory chip, the methods and systems described herein can also be used in other applications, such as in secure binding for establishing a secure communication link between any computing devices, e.g., binding between a host and any secure data storage application such as a hard disk, a magnetic or optic storage media and the like.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A memory system, comprising:
   an interface configured to communicate over an unsecured communication link with a host external to the memory system;
   a non-volatile memory pre-programmed with at least a device identifier and an initialization key, wherein the device identifier and the initialization key are additionally stored in association with one another in a database external to the memory system, the database is securely accessible by the host; and
   a controller configured to:
      send the device identifier to the host over the unsecured communication link;
      receive from the host, via the interface, binding information that was generated in the host;
      generate, using at least the binding information received from the host and the initialization key, a first binding key that matches a second binding key, wherein the second binding key is generated in the host based on the initialization key securely obtained by the host from the database by querying the database using the device identifier received from the controller; and
      securely communicate with the host over the communication link using the first binding key.

2. The memory system according to claim 1, wherein the binding information comprises a binding key generated by the host and encrypted using the initialization key obtained from the database, and wherein the controller is configured to generate the first binding key by decrypting the encrypted binding key from the binding information using the initialization key.

3. The memory system according to claim 1, wherein the binding information comprises a seed generated by the host, and wherein the controller is configured to generate the first binding key based on the seed and on the initialization key.

4. The memory system according to claim 3, wherein the controller is configured to generate the first binding key by calculating a hash function over the seed and the initialization key.

5. The memory system according to claim 3, wherein the controller is configured to receive from the host a signature that the host calculates over at least the seed and the initialization key obtained from the database, and to authenticate the binding information using the signature.

6. The memory system according to claim 1, wherein the controller is configured to receive from the host a signature calculated over at least part of the binding information, to authenticate the received binding information using the signature, and to accept the first binding key for communicating with the host only if the received binding information was authenticated successfully.

7. The memory system according to claim 1, wherein the controller is configured to receive a memory signature calculated over pre-programmed content of the non-volatile memory, to authenticate actual content of the non-volatile memory using the memory signature, and to accept the first binding key for communicating with the host only if the memory signature was authenticated successfully.

8. The memory system according to claim 7, wherein the database stores the memory signature in association with the device identifier, and wherein the controller is configured to receive, from the host, the memory signature that was retrieved by the host from the database using the device identifier.

9. The memory system according to claim 7, wherein the controller is configured to receive from the host a combined signature calculated over at least part of the binding information and over the memory signature, and to authenticate both the binding information and the pre-programmed content based on the combined signature.

10. A method, comprising:
in a memory system coupled to an external host, sending a device identifier to the host over an unsecured communication link, wherein the memory system comprises a non-volatile memory pre-programmed with at least the device identifier and an initialization key, wherein the device identifier and the initialization key are additionally stored in association with one another in a database external to the memory system, the database is securely accessible by the host,
receiving from the host binding information that was generated in the host;
generating by the memory system, using at least the received binding information and the initialization key, a first binding key that matches a second binding key, wherein the second binding key is generated in the host based on the initialization key securely obtained by the host from the database by querying the database using the device identifier received from the controller; and
securely communicating with the host over the communication link using the first binding key.

11. The method according to claim 10, wherein the binding information comprises a binding key generated by the host and encrypted using the initialization key obtained from the database, and wherein generating the first binding key comprises decrypting the encrypted binding key from the binding information using the initialization key.

12. The method according to claim 10, wherein the binding information comprises a seed generated by the host, wherein generating the first binding key comprises calculating the first binding key based on the seed and on the initialization key.

13. The method according to claim 12, wherein generating the first binding key comprises calculating a hash function over the seed and the initialization key.

14. The method according to claim 12, and comprising receiving from the host a signature that the host calculates over at least the seed and the initialization key obtained from the database, and authenticating the binding information using the signature.

15. The method according to claim 10, and comprising receiving from the host a signature calculated over at least part of the binding information, authenticating the received binding information using the signature, and accepting the first binding key for communicating with the host only if the received binding information was authenticated successfully.

16. The method according to claim 10, and comprising receiving a memory signature calculated over pre-programmed content of the non-volatile memory, authenticating actual content of the non-volatile memory using the memory signature, and accepting the first binding key for communicating with the host only if the memory signature was authenticated successfully.

17. The method according to claim 16, wherein the database stores the memory signature in association with the device identifier, and wherein receiving the memory signature comprises receiving, from the host, the memory signature that was retrieved by the host from the database using the device identifier.

18. The method according to claim 16, and comprising receiving from the host a combined signature calculated over at least part of the binding information and over the memory signature, and authenticating both the binding information and the pre-programmed content based on the combined signature.

* * * * *